United States Patent [19]
Westermeyer et al.

[11] Patent Number: 5,852,937
[45] Date of Patent: Dec. 29, 1998

[54] INDICATOR CAP AND METHOD OF MANUFACTURE THEREOF

[75] Inventors: Gary Westermeyer, Bluffs; Sean M. Fink, Springfield, both of Ill.

[73] Assignee: AC&R Components, Inc., Chatham, Ill.

[21] Appl. No.: 815,200

[22] Filed: Mar. 12, 1997

[51] Int. Cl.[6] .................................................. F25B 49/02
[52] U.S. Cl. ............................... 62/125; 62/129; 116/276
[58] Field of Search ......................... 62/125, 129, 127; 165/11.1; 116/206, 276

[56] References Cited

U.S. PATENT DOCUMENTS

| | | |
|---|---|---|
| 2,844,026 | 7/1958 | Wischmeyer et al. ............... 62/125 X |
| 3,142,287 | 7/1964 | Jones ................................. 62/125 X |
| 3,225,555 | 12/1965 | Chatlos .............................. 62/125 X |
| 5,103,648 | 4/1992 | Barbier . |
| 5,113,671 | 5/1992 | Westermeyer . |
| 5,271,245 | 12/1993 | Westermeyer . |
| 5,295,359 | 3/1994 | Reilly, Jr. et al. ........................ 62/125 |
| 5,327,997 | 7/1994 | Nash, Jr. et al. . |
| 5,404,730 | 4/1995 | Westermeyer . |
| 5,542,499 | 8/1996 | Westermeyer . |
| 5,553,460 | 9/1996 | Isaacs . |

OTHER PUBLICATIONS

Brochure entitled: "Compressor Protective Devices", by AC&R Components, Inc., Catalog 12B, printed Feb. 1996.

*Primary Examiner*—Harry B. Tanner
*Attorney, Agent, or Firm*—Hill & Simpson

[57] ABSTRACT

A sight glass assembly for visually indicating the presence of moisture, oil or an acid in a refrigerant flow of a refrigeration or air conditioning system and a method of manufacture thereof is disclosed. The sight glass assembly includes an indicator cap attached to an in-line connector body. The indicator cap includes a piece of transparent sight glass. The sight glass is attached to the indicator cap and to a retaining tube that holds an indicator material. In a preferred embodiment, the sight glass is attached to the indicator cap and to the retaining tube by at least partially melting the sight glass so that it bonds with the indicator cap and, when the sight glass is in at least a partially molten condition, pressing the retaining tube into an inside surface of the sight glass to fixedly attach the retaining tube to the sight glass.

18 Claims, 2 Drawing Sheets

INDICATOR CAP AND METHOD OF MANUFACTURE THEREOF

FIELD OF THE INVENTION

The present invention relates generally to mechanisms for indicating when contaminants such as water, water vapor, oil, lubricants or acids are present in a circulation system. More specifically, the present invention relates to indicators for providing a visual indication in the event water, water vapor, oil, lubricants or acids contaminate the refrigerant of a refrigeration or air conditioning system.

BACKGROUND OF THE INVENTION

Refrigeration systems utilize a compressor to compress a refrigerant gas, a condenser to cool the compressed gas and to cause the gas to condense into a liquid and an evaporator which enables the refrigerant to absorb heat from the area to be refrigerated as the liquid refrigerant expands and evaporates. Refrigerants, including FREON or ammonia, are characterized by their low vaporization temperatures and large heat of vaporization values. If water is permitted to become entrained in the refrigerant line, the water, with its relatively high vaporization temperature and low heat of vaporization values, will substantially lower the efficiency of the refrigeration system. Water can also freeze in the line causing restrictions, blockage and damage to the system components.

Further, contamination of the refrigerant with oil or lubricants also reduces the efficiency of a system. Still further, the combination of oils or lubricants, refrigerants and water can generate acids which can damage the system in addition to reducing the efficiency of the system.

Because refrigeration systems include a number of valves, filters and extended lengths of conduit, there are numerous areas or places in the system where water vapor water could be introduced. The most common point of entry for oil or lubricants is the compressor where oil or other lubricants are used to provide more effective seals in the compressor. Because of the drastic reduction of efficiency of a refrigeration system that has been contaminated with water, oil, lubricants or acids, it is important that an operator or maintenance person of the refrigeration system be warned or notified in the event the refrigerant has become contaminated with any of these substances.

Currently available indicators include an in-line connector body with two opposing ends for threadable connection to two conduits of the refrigeration system. The body further includes an integrally molded central opening that accommodates a sight glass. A piece of indicator paper is typically suspended within a cage inside the body and in front of the sight glass for view by an operator or maintenance person. A rear cap provides an anchor for the cage that accommodates the moisture-indicating paper.

One problem associated with currently-available moisture indicators is the difficulty in manufacturing these indicators. Specifically, the indicator cages must be mounted onto the rear caps manually and are not normally susceptible to installation by automated equipment. Further, because there is a space between the sight glass and the indicator paper, the indicator paper can be difficult to see if there is any mist or fog passing through the connector body. Accordingly, currently-available moisture indicators are difficult to manufacture and hence costly to produce and the cage or indicator paper holders have been known to become difficult to see during use.

Accordingly, there is a need for an improved moisture indicator that is easier to manufacture and which provides an improved means for holding the indicator paper or moisture indicator material in place during use.

SUMMARY OF THE INVENTION

The present invention addresses the aforenoted needs by providing a sight glass assembly that comprises an in-line connector body with two opposing ends for connection between two conduits of a refrigeration system. The connector body includes a through passageway extending between the two opposing ends. The connector body further comprises a central opening disposed between the two opposing ends for attachment to an indicator cap. The indicator cap of the present invention includes a lower sleeve portion for attachment to the central opening of the in-line connector body and an upper sleeve portion for accommodating a sight glass. The sight glass includes an inward facing surface is attached to a retaining tube. Preferably, the retaining tube is attached to the sight glass when the sight glass is in a partially molten condition and therefore the sight glass is melted around an upper end of the retaining tube. The retaining tube accommodates the indicator material directly in front of the sight glass for easy viewing by the operator or maintenance person.

In an embodiment, the lower sleeve of the indicator cap is threadably connected to the central opening of the in-line connector body.

In an embodiment, the retaining tube includes a permeable backing material disposed at its lower end for retaining the indicator material within the retaining tube during operation of the system.

In an embodiment, the permeable backing material is a metal screen.

In an embodiment, the lower end of the retaining tube is crimped around a metal screen which acts to hold the indicator material in place within the retaining tube.

In an embodiment, the retaining tube further accommodates a permeable sheet disposed between the indicator material and the lower end of the retaining tube.

In an embodiment, the retaining tube further accommodates a piece of filter paper disposed between the indicator material and the lower end of the retaining tube.

In an embodiment, the indicator material is moisture-indicating paper.

In an embodiment, the indicator material is litmus paper.

The present invention also provides an improved refrigeration system which provides a visual indication to the operator or maintenance person in the event water, oil, lubricants and/or acids have been allowed to contaminate the refrigerant. The refrigeration system includes an evaporator, compressor, condenser and receiver connected in a loop. One or more sight glass assemblies of the present invention are disposed between the receiver and the evaporator.

One or more of the sight glass assemblies may accommodate a piece of moisture-indicating material. One or more sight glass assemblies may accommodate a piece of litmus paper for indicating the presence of oils or acids.

The present invention also provides an improved method of manufacturing a sight glass which comprises the steps of providing an indicator cap comprising a lower sleeve portion for attachment to a connector body and an upper sleeve portion for accommodating a sight glass, providing a sight glass, inserting the sight glass into the upper sleeve portion of the cap, heating the cap and the sight glass to a temperature sufficient to melt the sight glass but insufficient to melt the cap, providing a retaining tube, pressing an upper end of the retaining tube onto an inward facing surface of the at least partially melted sight glass, cooling the sight glass so that it hardens around the upper end of the retaining tube, inserting an indicator material into the retaining tube, attaching a means for retaining the indicator material within the retaining tube onto a lower end of the retaining tube, providing an in-line connector body as described above and attaching the lower end of the indicator cap to the central opening of the in-line connector body so that the retaining tube is disposed within the connector body.

In an embodiment, the indicator cap is fabricated from brass.

In an embodiment, the sight glass is fabricated from an acrylic material.

In an embodiment, the sight glass is fabricated from a silicon glass.

In an embodiment, the sight glass is fabricated from float glass.

In an embodiment, the sight glass and indicator cap are heated to a temperature sufficient to melt the sight glass prior to insertion of the upper end of the retaining tube into the inward surface of the sight glass.

In an embodiment, the melting of the sight glass within the upper sleeve portion of the cap bonds the sight glass to the upper sleeve portion of the cap.

In an embodiment, an uppermost end of the sight glass that extends beyond the uppermost end of the upper sleeve portion of the cap is cropped off to provide a smooth upper surface for the sight glass assembly.

It is therefore an advantage of the present invention to provide an improved sight glass assembly that is easier and faster to manufacture than previously available sight glass assemblies.

Another advantage of the present invention is the secure attachment of the retaining tube, and therefore the indicator material, to the inside surface of the sight glass so that the indicator material is easier to see.

Other objects and advantages of the present invention will become apparent upon reading the following detailed description and appended claims, and upon reference to the accompanying drawings.

BRIEF DESCRIPTION OF THE DRAWINGS

For a more complete understanding of the present invention, reference should now be made to the embodiment illustrated in greater detail in the accompanying drawings and described below by way of an example of the present invention.

In the drawings.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
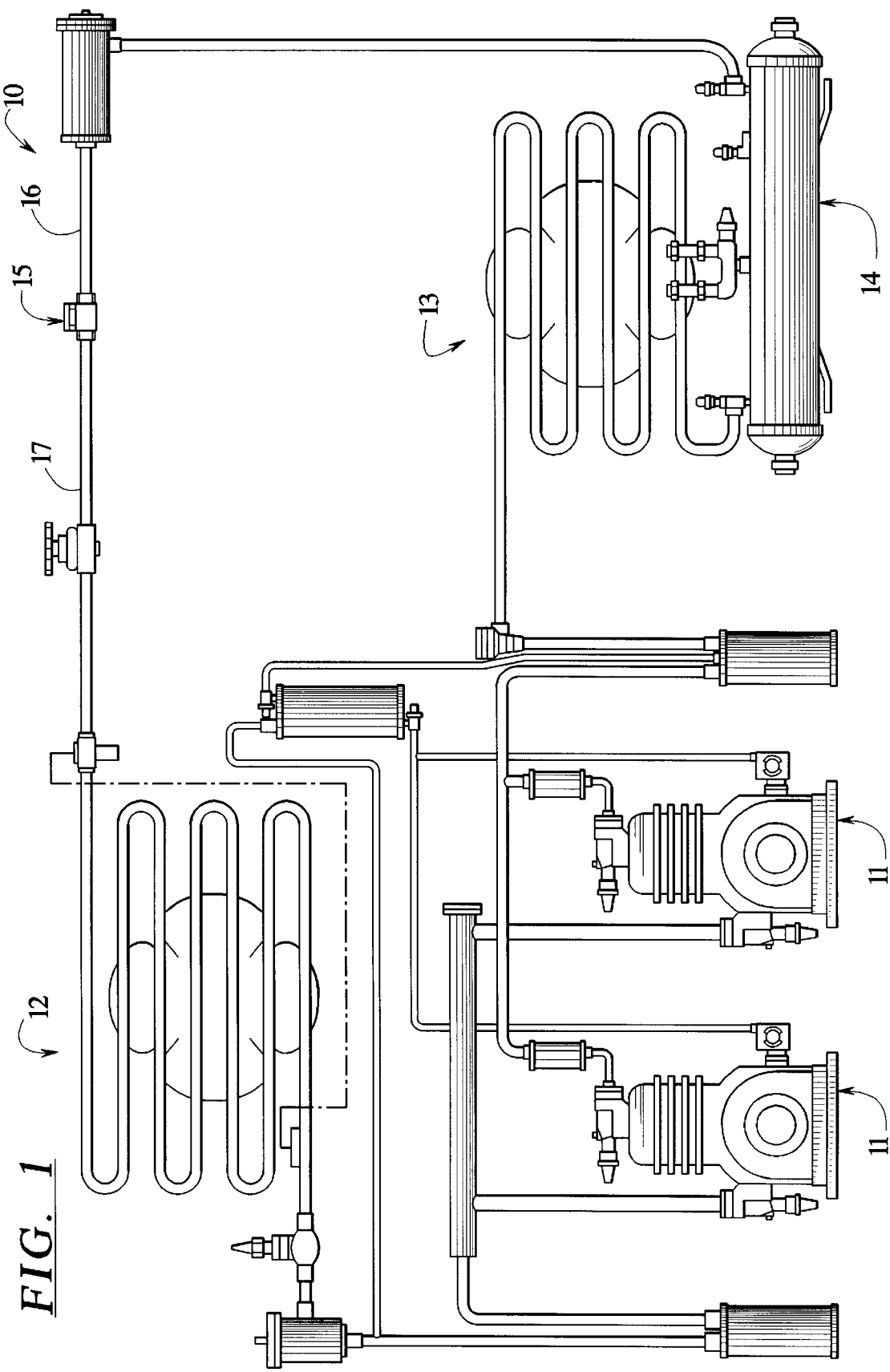
FIG. 1 is a schematic illustration of a refrigeration system constructed in accordance with the present invention.

A refrigeration system 10 is illustrated in FIG. 1. The system 10 includes one or more compressors shown at 11 which are used to compress a refrigerant gas after the gas has been expanded in the evaporator shown at 12. After the refrigerant has been compressed in a series of compressors shown at 11, it is condensed in a condenser shown generally at 13 and the liquid refrigerant is collected in a receiver shown at 14. The compressor shown at 11, the condenser shown at 13, the receiver shown at 14 and the evaporator shown at 12 are all connected together in a loop by appropriate piping. A sight glass assembly 15 made in accordance with the present invention is disposed between the receiver 14 and the evaporator 12. The sight glass assembly 15 provides the operator of the system 10 with a visual indication in the event water and/or oil has become entrained in the flow of refrigerant through a conduit 16. As noted above, the presence of water and/or oil in the refrigerant flow drastically reduces the efficiency of the system 10. Accordingly, the sight glass assembly 15 provides the operator with a visual indication that the refrigerant has become contaminated and that maintenance procedures are necessary.

Figure 2:
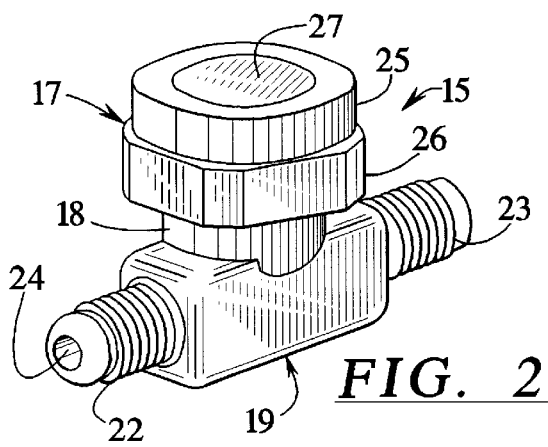
FIG. 2 is a perspective view of a sight glass assembly made in accordance with the present invention.
Figure 8:
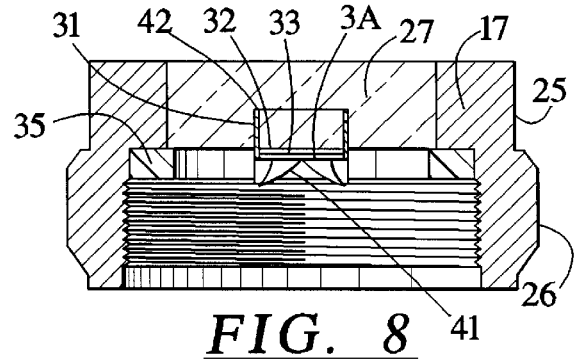
FIG. 8 is a sectional view taken substantially along line 8—8 of FIG. 5.

A perspective view of the sight glass assembly 15 is provided in FIG. 2. The assembly 15 includes an indicator cap 17 which is threadably connected to the central opening 18 of an in-line connector body 19. The connector body 19 includes two threaded opposing ends 22, 23 with a through passageway 24 extending therebetween. The through passageway 24 permits the refrigerant to flow through the conduit as shown at 16 to the conduit shown at 17 in FIG. 1.

The indicator cap 17 includes an upper sleeve portion 25 and a lower sleeve portion 26. The lower sleeve portion 26 includes a plurality of flat surfaces for accommodating a wrench or other tool in order to tighten the indicator cap 17 onto the threaded portion (not shown) of the central opening 18 of the connector body 19. The upper sleeve portion 25 of the indicator cap 17 accommodates a sight glass shown at 27.

Figure 4:
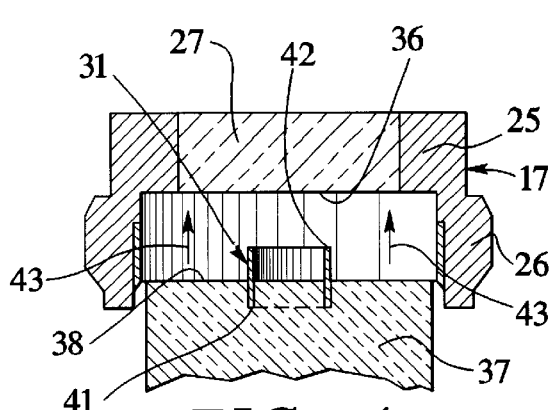
FIG. 4 is a sectional view of the indicator cap, sight glass and retaining tube, particularly illustrating a method of fabricating a sight glass assembly in accordance with the present invention.
Figure 5:
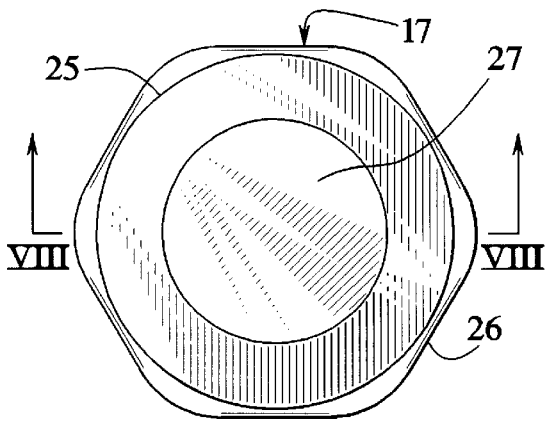
FIG. 5 is a top plan view of the indicator cap assembly shown in FIG. 2.
Figure 6:
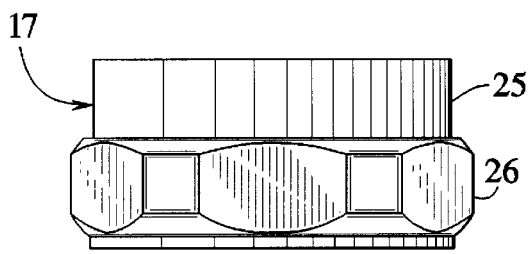
FIG. 6 is a front elevational view of the indicator cap assembly shown in FIG. 5.
Figure 3:
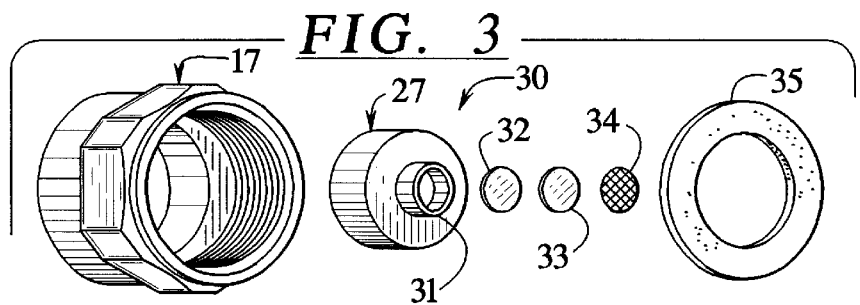
FIG. 3 is an exploded view of the indicator cap, sight glass, retaining tube, indicator material, permeable sheet, permeable backing and washer of the sight glass assembly shown in FIG. 2.

FIG. 3 is an exploded view of an indicator cap assembly 30 which includes the indicator cap 17, the sight glass 27 which is fixedly attached to a retaining tube 31 as further illustrated in FIG. 4, an indicator material shown at 32, a permeable sheet material shown at 33, a permeable backing material shown at 34 and a washer shown at 35.

Turning to FIG. 4, a method of attaching the retaining tube 31 to an inside surface 36 of the sight glass 27 is illustrated. First, the sight glass 27 is inserted into the upper sleeve portion 25 of the indicator cap 17. The indicator cap 17 and the sight glass 27 are heated to a temperature sufficient to melt the sight glass 27, but insufficient to melt the indicator cap 17. In a preferred embodiment, the indicator cap 17 is fabricated from steel and the sight glass material is a plate glass material, preferably fabricated using a float-glass process. When the glass 27 is sufficiently partially melted, the retaining tube 31 is mounted onto a graphite block 37. The graphite block 37 has a circular channel disposed at an end 38 of the block 37 for accommodating a lower end 41 of the retaining tube. With an upper end 42 of the retaining tube extending outward toward the partially molten glass 27, the block 37 is pushed in the direction of arrows indicated at 43 so that the upper end 42 of the retaining tube 31 becomes embedded in the inner surface 36 of the partially molten glass 27. Because the glass 27 is only partially melted and in a somewhat tacky form, the retaining tube 31 will stick to the inside surface 36 of the glass 27 and when the graphite block 37 is drawn in reverse direction of the arrows 43, the block 37 will become disengaged from the lower end 41 of the retaining tube 31.

Figure 7:
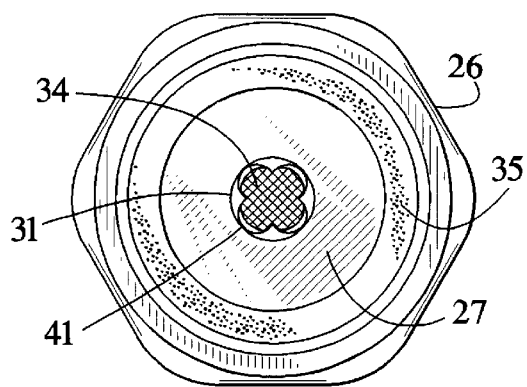
FIG. 7 is a bottom plan view of the indicator cap assembly shown in FIG. 5.

Still referring to FIG. 3, an additional permeable layer 33 may be disposed between the indicator material 32 and the permeable backing or screen 34. The permeable material 33 is preferably a round sheet of filter paper which will absorb water or oil that passes through the screen 34. The screen or permeable backing 34 provides a permeable plug for the lower end 41 of the retaining tube that permits water, oil or acids to pass through the screen 34 before engaging the absorbant layer 33 and indicator material 32. One preferred way of mounting the screen 34 to the lower end 41 of the retaining tube 31 is illustrated in FIG. 7 which includes a crimping of the lower end 41 of the retaining tube 31. In the alternative, the permeable backing 34 could be fabricated into a cap which mounts over the lower end 41 of the tube 31. The washer 35 provides a seal between the indicator cap 31 and the central opening 18 of the connector body 19.

The indicator material 32 may be a general moisture indicator material which typically consists of an absorbant paper covered with a combination of salts that change color in the presence of moisture. Various types of moisture indicating papers and the suppliers of those papers will be apparent to those skilled in the art. One suitable indicator paper is pink in a dry form but turns to blue in the event water becomes entrained in the refrigerant of a refrigeration system. Another suitable paper is green when dry and turns to a yellow color when exposed to water entrained in a refrigerant. Because combination of most refrigerants, oil and water can create acids in the refrigeration line, it is foreseeable that an operator may choose to utilize litmus paper as the indicator material 32 for detecting changes in the pH of the refrigerant flow. Of course, the indicator material 32 may also be one of a variety of salts that changes color in the presence of moisture. Finally, it is anticipated that indicators that detect the presence of oils or other hydrocarbons may be utilized as the indicator material 32. As indicated in U.S. Pat. No. 5,553,460, the leakage of oil into a refrigeration system is a problem faced by the operators of such systems and has resulted in the development of specially designed oil separators as indicated in said patent.

From the above description, it is apparent that the objects of the present invention have been achieved. While only certain embodiments have been set forth, alternative embodiments and various modifications will be apparent from the above description to those skilled in the art. For example, different materials for the indicator 32 may be utilized, additionally, the sight glass 27 may be fabricated from an acrylic or polymer material in addition to a glass material. Further, while the cap 17 and connector body 19 are preferably fabricated from steel and brass respectively, will be apparent to those skilled in the art that other materials can and should, in certain circumstances, be utilized. Further, there are various ways to contain the indicator material within the retaining tube 31 in addition to crimping a screen 34 in the end 41 of the tube 31. A cap or other suitable fitting can be utilized. These and other alternatives are considered equivalents and within the spirit and scope of the present invention.

What is claimed is:

1. A sight glass assembly comprising:

an in-line connector body comprising two opposing ends with a through passageway extending therebetween, the connector body further comprising a central opening disposed between the two opposing ends for attachment to an indicator cap, the indicator cap comprising a lower sleeve portion for attachment to the central opening of the connector body and an upper sleeve portion for accommodating a sight glass, the sight glass comprising an inward facing surface that is fixedly connected to a retaining tube that extends from the sight glass into the lower sleeve portion, the retaining tube accommodating indicator material, the retaining tube being held in place in the lower sleeve portion by the sight glass.

2. The sight glass assembly of claim 1 wherein the retaining tube is fixedly connected to the inward facing side of the sight glass by at least partially melting the sight glass and pressing an end of the tube into the partially melted glass.

3. The sight glass assembly of claim 1 wherein the lower sleeve portion of the cap is threadably connected to the central opening of the in-line connector body.

4. The sight glass assembly of claim 1 wherein the retaining tube further comprises an upper end that is fixedly connected to the inward facing side of the sight glass and a lower end, the indicator material being disposed between the upper and lower ends of the retaining tube, the retaining tube further accommodating a permeable backing disposed between the indicator material and the lower end of the retaining tube.

5. The sight glass assembly of claim 4 wherein the permeable backing is further characterized as being a screen.

6. The sight glass assembly of claim 4 wherein the lower end of the retaining tube is crimped inward to hold the indicator material between the upper and lower ends of the retaining tube.

7. The sight glass assembly of claim 4 further comprising a permeable sheet disposed between the permeable backing and the indicator material.

8. The sight glass assembly of claim 7 wherein the permeable sheet is further characterized as being a sheet of filter paper.

9. The sight glass assembly of claim 1 wherein the indicator material is moisture indicating paper which changes color in the presence of moisture.

10. The sight glass assembly of claim 1 wherein the indicator material is an indicating paper which changes color in the presence of an oil.

11. The sight glass assembly of claim 1 wherein the indicator material is an indicating paper which changes color in the presence of an acid.

12. A refrigeration system comprising:

an evaporator in communication with a compressor, the compressor in communication with a condenser, the condenser in communication with a receiver, the receiver in communication the evaporator, a sight glass assembly disposed between the receiver and the evaporator, the sight glass assembly comprising an in-line connector body comprising two opposing ends for connection between the receiver and the evaporator, the connector body further comprising a central opening for attachment to an indicator cap, the indicator cap comprising a lower sleeve portion for attachment to the central opening of the connector body and an upper sleeve portion for accommodating a sight glass, the sight glass comprising an inward facing surface that is fixedly connected to a retaining tube that extends from the sight glass into the lower sleeve portion, the retaining tube accommodating an indicator material, the retaining tube being held in place in the lower sleeve portion by the sight glass.

13. The refrigeration system of claim 12 wherein the retaining tube is fixedly connected to the inward facing side of the sight glass by melting the glass and pressing an end of the tube into the glass.

14. The refrigeration system of claim 12 wherein the retaining tube further comprises an upper end that is fixedly connected to the inward facing side of the sight glass and a lower end, the indicator material being disposed between the upper and lower ends of the retaining tube, the retaining tube further accommodating a screen disposed between the indicator material and the lower end of the retaining tube for retaining the indicator material in the retaining tube.

15. The refrigeration system of claim 14 wherein the lower end of the retaining tube is crimped inward around the screen.

16. A sight glass assembly for detecting water in a refrigerant line, the assembly for connection between two conduit ends of the refrigerant line, the assembly comprising:

an in-line connector body comprising two opposing ends for connection between the conduit ends, the connector body further comprising a central opening for attachment to an indicator cap, the indicator cap comprising a lower sleeve portion for attachment to the central opening of the connector body and an upper sleeve portion for accommodating a sight glass, the sight glass being fixedly bonded to the upper sleeve portion of the indicator cap, the sight glass comprising an inward facing surface that is at least partially melted around and fixedly bonded to an upper end of a retaining tube, the retaining tube further comprising a lower end, the lower end of the retaining tube being attached to a screen, the retaining tube accommodating a piece of moisture indicating paper between the screen and the sight glass.

17. A sight glass assembly comprising:

an in-line connector body comprising two opposing ends with a through passageway extending therebetween, the connector body further comprising a central opening disposed between the two opposing ends for attachment to an indicator cap, the indicator cap comprising a lower sleeve portion for attachment to the central opening of the connector body and an upper sleeve portion for accommodating a sight glass, the sight glass comprising an inward facing surface that is attached to a retaining tube, the retaining tube being attached to the inward facing side of the sight glass by at least partially melting the sight glass and pressing an end of the tube into the partially melted glass, the retaining tube accommodating indicator material.

18. A refrigeration system comprising:

an evaporator in communication with a compressor, the compressor in communication with a condenser, the condenser in communication with a receiver, the receiver in communication the evaporator, a sight glass assembly disposed between the receiver and the evaporator, the sight glass assembly comprising an in-line connector body comprising two opposing ends for connection between the receiver and the evaporator, the connector body further comprising a central opening for attachment to an indicator cap, the indicator cap comprising a lower sleeve portion for attachment to the central opening of the connector body and an upper sleeve portion for accommodating a sight glass, the sight glass comprising an inward facing surface that is attached to a retaining tube, the retaining tube being attached to the inward facing side of the sight glass by melting the glass and pressing an end of the tube into the glass, the retaining tube accommodating an indicator material.

* * * * *